United States Patent
Fina et al.

(10) Patent No.: US 10,438,102 B2
(45) Date of Patent: Oct. 8, 2019

(54) RFID INTEGRATED CIRCUIT

(71) Applicant: NXP B.V., Eindhoven (NL)

(72) Inventors: Thomas Fina, Graz (AT); Roland Brandl, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/952,107

(22) Filed: Apr. 12, 2018

(65) Prior Publication Data

US 2018/0300595 A1    Oct. 18, 2018

(30) Foreign Application Priority Data

Apr. 14, 2017 (EP) ..................... 17166710

(51) Int. Cl.
*G06K 19/07* (2006.01)
*G06K 7/10* (2006.01)

(52) U.S. Cl.
CPC ..... *G06K 19/0722* (2013.01); *G06K 7/10297* (2013.01); *G06K 19/07* (2013.01); *G06K 19/0723* (2013.01)

(58) Field of Classification Search
CPC ................. G06K 19/0722; G06K 7/10297
USPC ........................................ 340/12.51
See application file for complete search history.

(56) References Cited

U.S. PATENT DOCUMENTS

| | | | |
|---|---|---|---|
| 6,563,740 B2 | 5/2003 | Thomsen et al. | |
| 6,587,378 B2 | 7/2003 | Hassan et al. | |
| 8,504,884 B2 * | 8/2013 | Eguchi | G11C 29/50004 714/721 |
| 8,977,914 B2 | 3/2015 | Eguchi et al. | |
| 9,405,941 B2 * | 8/2016 | Smith | G06K 7/10009 |
| 2008/0124162 A1 * | 5/2008 | Yamaguchi | G06K 7/087 400/76 |
| 2015/0286567 A1 * | 10/2015 | Park | G06F 11/00 711/143 |

FOREIGN PATENT DOCUMENTS

| | | |
|---|---|---|
| EP | 1 667 336 A1 | 6/2006 |
| WO | 2008/002965 A2 | 1/2008 |
| WO | 2008/076898 A1 | 6/2008 |

OTHER PUBLICATIONS

Extended European Search Report for Patent Appl. No. 17166710.8 (dated Nov. 8, 2017).

* cited by examiner

*Primary Examiner* — Vernal U Brown (57) ABSTRACT

An integrated circuit for a radio-frequency identification (RFID) tag is described. In an example embodiment, the integrated circuit (101) comprises: a memory (104) for storing data; a transceiver (107) for receiving signals from, and transmitting signals to, an antenna (102); and a controller (103) configured to process signals received via the transceiver (107) and to access data stored in the memory (104); wherein upon receiving, via the transceiver module (107), a lock command referring to a data block in the memory (104), the controller (103) is configured to perform a data integrity check on the data block to determine whether the data block is strongly stored.

20 Claims, 4 Drawing Sheets

RFID INTEGRATED CIRCUIT

CROSS-REFERENCE TO RELATED APPLICATIONS

This application claims the priority under 35 U.S.C. § 119 of European patent application no. 17166710.8, filed on Apr. 14, 2017, the contents of which are incorporated by reference herein.

FIELD

The disclosure relates to an integrated circuit for a radio-frequency identification (RFID) tag.

BACKGROUND

RFID tags are used to store information which can be wirelessly accessed with an RFID reader. For example electronic product codes (EPCs), keys, or passwords may be stored on an RFID tag. Such information may be written into the memory of an RFID tag during an initialisation process, either at assembly of the tag, or when the tag is to be used.

The initialisation process may be performed using an RFID reader (or RFID interrogator). The reader requests the tag to store a block of data, such as an EPC, on a memory in the RFID tag. The request may specify a location in the memory at which to store the data block. The tag receives this request and stores the requested data block at the requested memory location. This process may be repeated on multiple RFID tags.

Problems during the writing step can cause the data to be incorrectly stored. Weakly stored data may be the result of an interruption in the communication between the RFID reader and the RFID tag during the data writing process. Weakly stored data can cause data loss and corruption of information much earlier that would be expected for correctly (i.e. strongly) stored data. Corrupted data blocks can harm the intended application of the tag. For example, where the tag stores an EPC for inventory purposes, a corruption of part of the EPC stored on the tag may make the inventory process less efficient and cause additional costs. Corrupted passwords may limit tag functionality or prevent access.

SUMMARY

In accordance with a first aspect there is provided an integrated circuit for an RFID tag, the integrated circuit comprising: a memory for storing data; a transceiver for receiving signals from, and transmitting signals to, an antenna; and a controller configured to process signals received via the transceiver and to access data stored in the memory, wherein upon receiving, via the transceiver module, a lock command referring to a data block in the memory, the controller is configured to perform a data integrity check on the data block to determine whether the data block is stored correctly.

In an example embodiment the data integrity check on the data block comprises: performing a read operation on the data block under a first read condition; performing the read operation on the data block under a second read condition different than the first read condition; and comparing a result of the read operation performed under the first read condition to a result of the read operation performed under the second read condition to determine if the data block is stored in the memory correctly.

In an example embodiment the controller is configured to determine that the data block is not stored correctly if the result of the read operation performed under the first read condition does not match the result of the read operation performed under the second read condition.

In an example embodiment the memory comprises a read amplifier having a reference current, and wherein in the second read condition the reference current is lower than in the first read condition.

In an example embodiment the memory comprises a voltage offset generator, and wherein in the second read condition a larger offset voltage is applied to the memory than in the first read condition.

In an example embodiment the read operation is a checksum operation.

In an example embodiment, if the controller determines that that the data block is not stored correctly, the controller is further configured to transmit an error signal.

In an example embodiment, if the controller determines that the data block is stored correctly, the controller is further configured to perform a lock operation on the data block in the memory.

In accordance with a second aspect there is provided an RFID tag comprising: an antenna for transmitting and receiving signals to and from an RFID reader; and an integrated circuit comprising: a memory for storing data; a transceiver for receiving signals from, and transmitting signals to, the antenna; and a controller configured to process signals received by the antenna and to access data stored in the memory, wherein upon receiving, via the transceiver module, a lock command referring to a data block in the memory, the controller is configured to perform a data integrity check on the data block to determine whether the data block is stored correctly.

In an example embodiment the RFID tag is a passive RFID tag.

Any example embodiment of the first aspect may also apply to the second aspect.

In accordance with a third aspect there is provided a method of determining whether a data block is correctly stored in a memory of an RFID tag, the method comprising: receiving, at an antenna of the RFID tag, a lock command; performing a data integrity check on the data block to determine whether the data block is stored in the memory correctly; and in response to receiving the lock command, performing a data integrity check on the data block to determine whether the data block is stored correctly.

In an example embodiment performing a data integrity check on the data block comprises: performing a read operation on the data block under a first read condition; performing the read operation on the data block under a second read condition different than the first read condition; and comparing a result of the read operation performed under the first read condition to a result of the read operation performed under the second read condition to determine whether the data block is stored in the memory correctly.

In an example embodiment if the result of the read operation performed under the first read condition does not match the result of the read operation performed under the second read condition, the method further comprises determining that the data block is not stored correctly.

In an example embodiment the memory comprises a read amplifier having a reference current, and wherein in the second read condition the reference current is lower than in the first read condition.

In an example embodiment the memory comprises a voltage offset generator, and wherein in the second read condition a larger offset voltage is applied to the memory than in the first read condition.

In an example embodiment performing the read operation comprises performing a checksum operation.

In an example embodiment, if the data block is not determined to be stored in the memory correctly, the method further comprises transmitting an error signal from the antenna of the RFID tag.

In an example embodiment, if the data block is determined to be stored in the memory correctly, the method further comprises performing a lock operation on the data block stored in the memory.

In an example embodiment the RFID tag is a passive RFID tag.

In accordance with a fourth aspect there is provided a method of storing a data block on an RFID tag, the method comprising: transmitting to the RFID tag, from an RFID interrogator, a write command comprising the data block; storing the data block in a memory of the RFID tag; transmitting to the RFID tag, from the RFID reader, a lock command; performing a data integrity check on the data block to determine whether the data block is stored in the memory correctly; and if the data block is determined to be stored correctly, performing a lock operation on the data block in the memory.

Any example embodiment of the third aspect may apply equally to the fourth aspect.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 1:
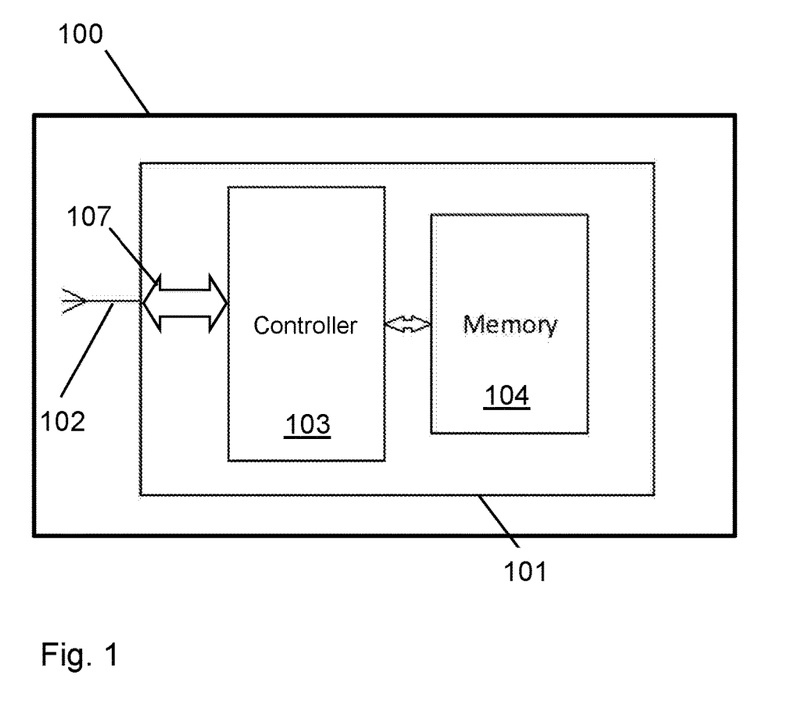
FIG. 1 is a schematic diagram illustrating an example embodiment of an RFID tag.

FIG. 1 shows an RFID tag 100 comprising an integrated circuit (IC) 101 according to the present disclosure. The tag 100 further comprises an antenna 102 for transmitting and receiving communications, for example to and from an RFID interrogator (or RFID reader).

The IC 101 comprises a controller 103, a memory 104 and a transceiver 107. The controller 103 is configured to receive and process signals from the antenna 101 via the transceiver 107, and to access the memory 104. Data, such as an electronic product code (EPC), may be stored in the memory 104. The data may be stored on one or more data blocks of memory 104. A data block may for example be an individual bit, a plurality of bits, a word, a memory bank, or data block inside a memory bank. The memory 104 may be a non-volatile memory.

Data is stored in the memory 104 during an initialisation process. An RFID interrogator transmits a write command to the RFID tag 100. The write command comprises data to be stored in the memory 104. The antenna 102 of the tag 100 receives the write command, and the command is interpreted by the controller 103. The controller 103 accesses the memory 104, and instructs the memory 104 to store the data received with the write command.

After data has been stored in the memory 104, the data block or blocks storing the data may be locked, so that the data cannot be overwritten. The RFID interrogator may transmit a lock command to the tag 100, which is processed by the controller 103.

Interruptions in the writing process can lead to the data being incorrectly, or weakly, stored. Storing data to the memory 104 typically requires more energy than reading data from the memory. A programming voltage may be applied to the memory 104 to provide this energy. The voltage may be generated by an external or internal circuit, for example a charge pump, and has to be leveled up before, and leveled down after, the data writing process. For passive RFID tags in particular, energy may have to be supplied wirelessly from an RFID interrogator for the write process, making weak storage of data more likely for passive tags.

Any interruption or delay in this process, such as field resets or distortion, may lead to corrupted data being stored, or to the data being weakly stored. Weakly stored data is likely to decay overtime, so that the data becomes unreadable. However, immediately after the write process weakly stored data may still be readable, so weakly stored data will not necessarily be identified by a simple read of the data after the writing process.

Embodiments of the present disclosure may overcome problems of weakly stored data from interrupted writing processes. As is discussed in more detail below, the IC 101 automatically runs a data integrity check on the stored data to determine if it is stored correctly when a lock command is received. The data integrity check identifies if data is weakly stored, allowing it to be corrected. As the process is automatic, it does not significantly delay the data writing and locking process.

Figure 2:
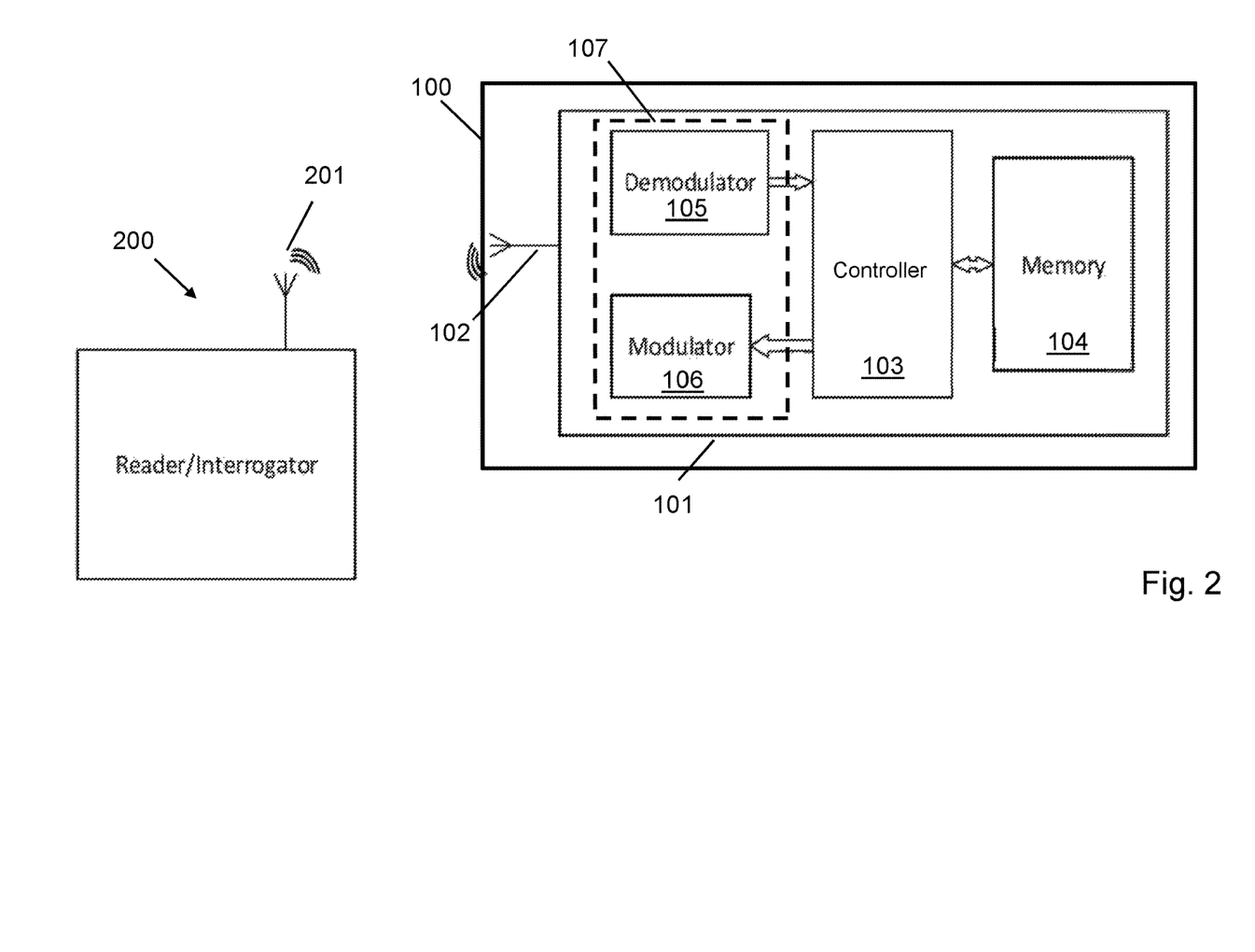
FIG. 2 is a schematic diagram illustrating communication between an RFID tag and an RFID interrogator.
Figure 3:
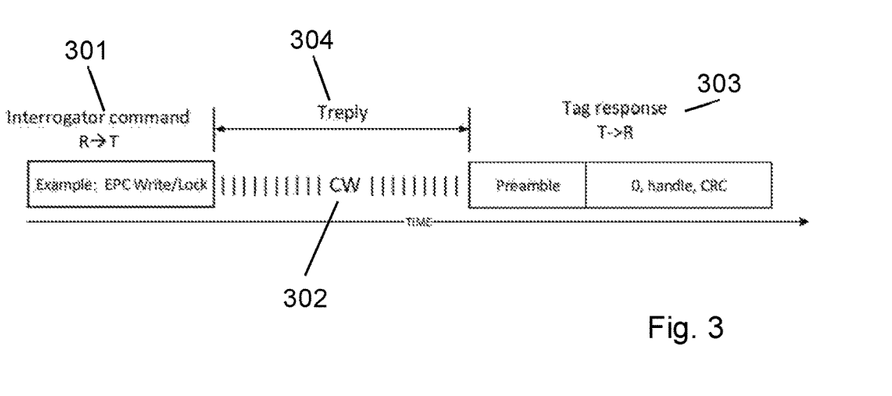
FIG. 3 is a schematic diagram illustrating an example sequence of communications between an RFID tag and interrogator.

The process of transmitting commands to the RFID tag 100 is shown in more detail in FIGS. 2 and 3.

FIG. 2 shows an RFID reader/interrogator 200 communicating with an RFID tag 100. Interrogator 200 comprises an antenna 201 which can transmit signals to the tag 100, and receive signals from the tag 100. The signals may be in the low-frequency (LF), high-frequency (HF) (typically 13.56 MHz) or ultrahigh-frequency (UHF) (e.g. 960 MHz) radio domains. The interrogator 200 transmits information by modulating a continuous waveform field (CW) over its antenna 201.

Signals transmitted from the interrogator 200 may be received by the tag antenna 102, and from there passed to the controller 103 via the transceiver 107, comprising a demodulator 105 for incoming signals from the antenna 102 and a modulator 106 for outgoing signals to the antenna 102. The demodulator 105 may provide an envelope signal or the decoded bit data or byte data or as an interpreted command to the controller 103.

The controller 103 may verify received signals, for example checking passwords and checksums of the interrogator command. Depending upon the instructions in the signal, the controller 103 may then access the memory 104, for example to read from or write to the memory 104. At the end of this process the controller 103 may calculate a response to the interrogator 200 that is transmitted via the tag antenna 102. The modulator 106 may for example modulate a reflection coefficient of the tag antenna 102 to transmit the signal.

The interrogator 200 and tag 100 may communicate in a number of ways. One example embodiment may be the full duplex mode or half duplex mode. A half duplex communication mode is illustrated in FIG. 3, illustrating a successful command and reply sequence between a reader/interrogator and a tag. In this example process, the interrogator 200 always "talks first" by sending a command 301 to the tag 100 (or a plurality of tags within range of the reader) and then provide a continuous waveform (CW) field 302. The tag 100 may listen to the request, process it and provide a response 303 to the interrogator 200 after a certain reply time 304.

There are some industry standards for this communication between interrogator and tag(s), such as ISO 14443, ISO 15693 or EPCglobal Gen2. All these standards define commands to read data from, and store or lock data to, the memory 104. The standard commands described below correspond to the commands defined under the EPCglobal Gen2, but the disclosure is not limited to this particular standard.

An example of a standard read command is shown in Table 1 below. The read command requests data of a certain length, indicated by WordCount, from a certain location, indicated by WordPtr, within the memory 104. The controller 103 of the tag 100 reads the memory 104 and transmits a response comprising the requested data back to the interrogator 200. An example response is shown in Table 2 below.

TABLE 1

Example read command.

|  | Command | MemBank | WordPtr | WordCount | RN | CRC |
|---|---|---|---|---|---|---|
| # of bits: | 8 | 2 | EBV | 8 | 16 | 16 |
| description: | 11000010 | 00: Reserved<br>01: EPC<br>10: TID<br>11: User | Starting address pointer | Number of words to read | handle | CRC-16 |

TABLE 2

Example tag response.

|  | Header | Memory Words | RN | CRC |
|---|---|---|---|---|
| # of bits: | 1 | Variable | 16 | 16 |
| description: | 0 | Data | handle | CRC-16 |

A standard write command is shown in Table 3 below. The write command requests that a certain amount of data, which may be sent with the command, is stored at a particular location, identified by WordPtr, within the memory 104. The controller 103 programs the requested data to the requested memory location. The data to be stored may be, for example, an EPC, a password, a key, or parts thereof.

TABLE 3

Example standard write command.

|  | Command | MemBank | WordPtr | Data | RN | CRC |
|---|---|---|---|---|---|---|
| # of bits: | 8 | 2 | EBV | 16 | 16 | 16 |
| description: | 11000011 | 00: Reserved<br>01: EPC<br>10: TID<br>11: User | Address pointer | RN16 ⊗ word to be written | wordhandle | CRC-16 |

A standard lock command is shown in Table 4 below. The lock command requests in its payload, shown in more detail in Table 5 below, that certain data blocks or memory banks within the memory 104 are locked from write and/or read access. The lock command may be a normal lock, so that a RFID interrogator with the correct permission, e.g. a correct password, may unlock or overwrite the data. The lock may alternatively be a permanent lock, which cannot be unlocked by any interrogator.

TABLE 4

Example standard lock command.

|  | Command | Payload | RN | CRC |
|---|---|---|---|---|
| # of bits: | 8 | 20 | 16 | 16 |
| description: | 11000101 | Mask and Action Fields | handle | CRC-16 |

TABLE 5

Example lock-command payload.

| 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| Kill Mask | | Access Mask | | EPC Mask | | TID Mask | | File_0 Mask | | Kill Action | | Access Action | | EPC Action | | TID Action | | File_0 Action | |

Typically the initialisation process for a tag 100 comprises sending from an RFID interrogator a write command to the tag 100, the write command comprising data, e.g. an EPC, to be stored in the memory 104, and sending a lock command to lock those parts of the memory 104 in which the information has been stored. The data may be verified to check that it matches the intended data, but this does not identify weakly stored data.

A data integrity check is automatically performed by the controller 103 on the data in the memory 104 after receiving a lock command. The data integrity check determines whether the data is correctly, i.e. strongly, stored in the memory 104. If the data is correctly stored, the controller 103 may lock the data. If the data is not correctly stored the controller 103 may transmit an error signal, via the antenna 102, to the interrogator 200. Another attempt may then be made to store the data correctly in response to the error signal.

Figure 4:
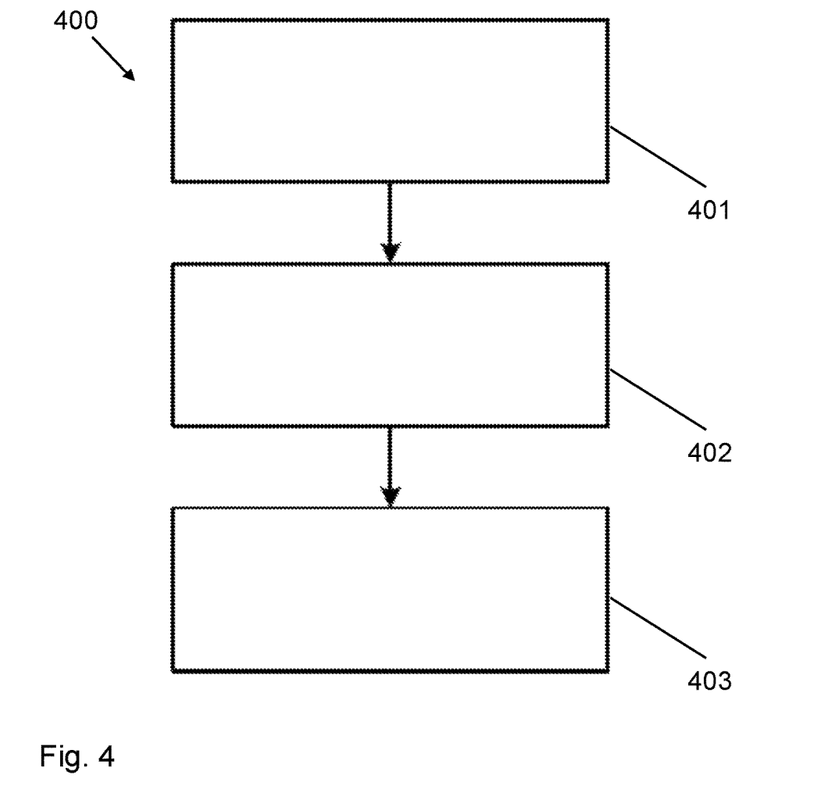
FIG. 4 is a schematic flow chart illustrating an example method of performing a data integrity check.

FIG. 4 illustrates a method 400 that may be performed by the controller 103. At step 401 a lock command is received. The lock command may specify that all of memory 103 is to be locked, or that only certain data blocks of the memory 103 are to be locked. At step 402, a data integrity check is performed. The data integrity check may be performed on all of the memory 103, or only on certain data blocks or parts of data blocks, of the memory 103, in particular those data blocks that are intended to be locked. The data integrity check may be performed for all data blocks at once, or one after another. At step 403, it is determined whether data stored in the memory 103, or in certain data blocks of the memory, is stored correctly.

The data integrity check may be a margin check. A margin check may for example determine whether the difference between a stored voltage and a reference voltage is greater than a pre-determined margin.

As the data integrity check is performed automatically by the IC 101 upon receipt of a lock command, any time lost to performing an integrity check is minimal. Performing the check after the lock command is received is particularly beneficial compared to performing a check after each write command. Several write commands may be sent to a tag 100, so performing a data integrity check after each write command would slow down the data writing process.

Figure 5:
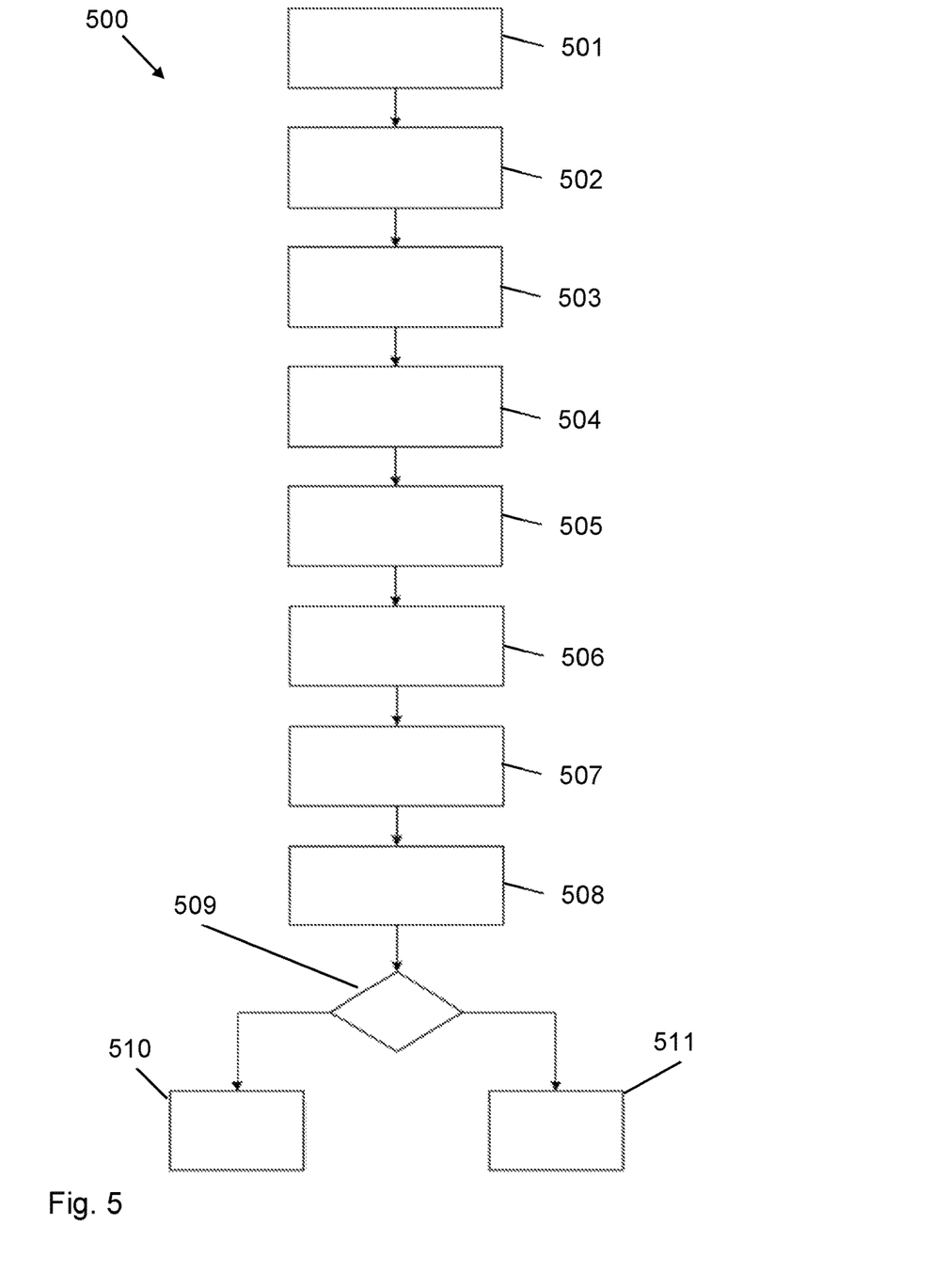
FIG. 5 is a schematic flow chart illustrating an example method of performing a data integrity check.

FIG. 5 illustrates an example embodiment of a method of performing a data integrity check that may be performed by the controller 103. In this example integrity check, a read operation is performed on a data block of the memory 104 with the memory in a first condition, and then performed again on the data block with the memory in a second condition.

At step 501 a lock command is received from an interrogator 200. The lock command is processed by the controller 103 as discussed above. At step 502 a first read condition of the memory is set. At step 503 a read operation, for example a checksum, is performed on the data in a data block of the memory 103. At step 504 the result of this read operation is stored, for example in the memory 104 or in a buffer memory, e.g. RAM.

At step 505 a second read condition of the memory is set. At step 506 the same read operation is performed on the data in the data block of the memory 103. At step 507 the result of this read operation is stored, for example in the memory 104 or in a buffer memory, e.g. RAM.

At step 508, the result of the first read is compared to the result of the second read, and at step 509 it is determined whether the data is stored correctly in the memory 104. The data may be determined to be stored correctly if the two results are identical.

If the data is determined to be stored correctly, the method proceeds to step 510, wherein the controller 103 instructs the memory 104 to lock the data block. In alternative examples the controller 103 may perform further data integrity checks on other data blocks. In these examples the controller 103 may instruct the memory to lock data blocks after a certain number, or all, data blocks have been checked with a data integrity check.

If the data is not determined to be stored correctly, the method proceeds to step 511, wherein the controller 103 transmits an error signal, via the tag antenna 102, to the interrogator 200. The error signal may specify which data block contains weakly stored data. In response, the interrogator 200 may re-send the write command for that data block, or all data blocks.

The first and second read conditions may place the memory 103 in "best case" condition for reading data and a "worst case" condition for reading data respectively. For example, in at least one read condition the memory 103 may be placed under stress, to make reading data accurately more difficult. For example, a reference current of a read amplifier of the memory may be changed, or an offset voltage may be applied to the memory 103 to place the memory under stress. An offset voltage may be provided by an internal offset voltage generator included in the memory 104, controller 103, or otherwise in integrated circuit 100. Where the data block comprises a plurality of bits, each bit comprising a high voltage "1" or a low voltage "0", the first and second read conditions may be set for reading either a "0" or a "1". For example the first read condition may comprise applying an offset voltage that facilitates accurate reading of "1"s, and makes accurate reading of "0"s difficult; and the second read condition may comprise applying an offset voltage that facilitates accurate reading of "0"s, and makes accurate reading of "1"s difficult.

In other example embodiments, performing only a single read operation may be performed. For example, the architecture of memory 104 may be such that a "1" may degrade overtime to a "0", but a "0" is highly unlikely to degrade to a "1". Thus it may only be necessary to perform a single read operation to test the "1"s in a data block.

In an example embodiment, the data stored in a data block may be read and compared to an alternative store of the data, for example in a pre-read buffer (e.g. RAM). After receiving a lock command the controller 104 may set the memory 104 in a read condition in which the binary "1"s in the data block are evaluated, for example setting an offset voltage which makes reading "1"s difficult. The data may be read, and compared to the nominally identical data in the pre-read buffer. If the data read from the memory block and the pre-read buffer match, the data is determined to be stored correctly.

From reading the present disclosure, other variations and modifications will be apparent to the skilled person. Such variations and modifications may involve equivalent and other features which are already known in the art of RFID tags and integrated circuits for RFID tags and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. An integrated circuit for an RFID tag, the integrated circuit comprising:
   an antenna;
   a memory configured to store data;
   a transceiver configured to receive signals from, and transmit signals to, the antenna; and
   a controller configured to process signals received via the transceiver and to access data stored in the memory,
   wherein upon receipt of, via the transceiver module, a lock command referring to a data block in the memory, the controller is further configured to perform a data integrity check on the data block to determine whether the data block is strongly stored, wherein the data integrity check comprises:
   perform a read operation on the data block under a first read condition, wherein the read operation comprises a checksum operation performed on the data block, and the checksum operation performed on the data block under the first read condition generates a first checksum,
   store the first checksum in a first buffer,
   perform the read operation on the data block under a second read condition different than the first read condition, wherein the checksum operation performed on the data block under the second read condition generates a second checksum,
   store the second checksum in a second buffer,
   compare the first checksum to the second checksum, and
   in response to a match between the first checksum and the second checksum, perform the lock command on the data block.

2. The integrated circuit of claim 1, wherein
   the data integrity check further comprises:
   in response to no match between the first checksum and the second checksum, disregard the lock command on the data block and transmit an error message via the antenna, wherein the error message indicates that one or more bits of the data block store a decayed voltage.

3. The integrated circuit of claim 2, wherein the lock command is transmitted by an interrogator, and the error message is received by the interrogator.

4. The integrated circuit of claim 3, wherein
   in response to receipt of the error message, the interrogator is configured to transmit a write command comprising the data block to the RFID tag, and
   in response to receipt of the write command via the transceiver module, the controller is further configured to store the data block in the memory.

5. The integrated circuit of claim 1, wherein the memory comprises a read amplifier configured to receive a reference current, and wherein in the second read condition the reference current is lower than in the first read condition.

6. The integrated circuit of claim 1, wherein
   the memory comprises a voltage offset generator, and wherein in the second read condition a larger offset voltage is applied to the memory than in the first read condition.

7. The integrated circuit of claim 1, wherein
   prior to receipt of the lock command, a write command comprising the data block is received via the transceiver module, and
   in response to receipt of the write command, the controller is further configured to store the data block in the memory.

8. The integrated circuit of claim 7, wherein the write command is transmitted by an interrogator.

9. A method of determining whether data is strongly stored in a memory of an RFID tag, the method comprising:
   receiving, at an antenna of the RFID tag, a lock command referring to a data block stored in the memory of the RFID tag; and
   in response to receiving the lock command, performing, by a controller of the RFID tag, a data integrity check on the data block to determine whether the data block is strongly stored, wherein the data integrity check comprises:
   performing a read operation on the data block under a first read condition, wherein the read operation comprises a checksum operation performed on the data block, and the checksum operation performed on the data block under the first read condition generates a first checksum, storing the first checksum in a first buffer of the RFID tag, performing the read operation on the data block under a second read condition different than the first read condition, wherein the checksum operation performed on the data block under the second read condition generates a second checksum, storing the second checksum in a second buffer of the RFID tag, comparing the first checksum to the second checksum, and in response to the first checksum matching the second checksum, performing the lock command on the data block.

10. The method of claim 9, wherein the data integrity check further comprises:

in response to the first checksum not matching the second checksum, disregarding the lock command on the data block and transmitting an error message via the antenna, wherein the error message indicates that one or more bits of the data block store a decayed voltage.

11. The method of claim 10, wherein the lock command is transmitted by an interrogator, and the error message is received by the interrogator.

12. The method of claim 11, further comprising:

in response to receiving the error message, transmitting a write command comprising the data block to the RFID tag by the interrogator to correct the one or more bits of the data block that store the decayed voltage.

13. The method of claim 12, further comprising:

in response to receiving the write command at the antenna of the RFID tag, storing the data block in the memory of the RFID tag by the controller of the RFID tag.

14. The method of claim 9, wherein the memory comprises a read amplifier configured to receive a reference current and wherein, in the second read condition, the reference current is lower than in the first read condition.

15. The method of claim 9, wherein the memory comprises a voltage offset generator and wherein, in the second read condition, a larger offset voltage is applied to the memory than in the first read condition.

16. The method of claim 9, further comprising:

initializing the RFID tag prior to the receiving the lock command, wherein the initializing the RFID tag comprises:

receiving, at the antenna of the RFID tag, a write command comprising the data block, and in response to the receiving the write command, storing the data block in the memory of the RFID tag by the controller of the RFID tag.

17. The method of claim 16, wherein the write command is transmitted by an interrogator.

18. The method of claim 9, wherein the data block comprises a plurality of bits of the memory.

19. The method of claim 18, wherein the plurality of bits comprises an entirety of the memory.

20. The method of claim 19, wherein the memory is divided into a plurality of parts, and the data integrity check is performed on each part in order.

* * * * *